US009555705B2

(12) United States Patent
Kaita et al.

(10) Patent No.: US 9,555,705 B2
(45) Date of Patent: Jan. 31, 2017

(54) VEHICLE

(75) Inventors: Keiji Kaita, Miyoshi (JP); Takeshi Hoshiba, Anjo (JP); Takahiko Hirasawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/115,798

(22) PCT Filed: May 12, 2011

(86) PCT No.: PCT/JP2011/060936
§ 371 (c)(1),
(2), (4) Date: Nov. 5, 2013

(87) PCT Pub. No.: WO2012/153416
PCT Pub. Date: Nov. 15, 2012

(65) Prior Publication Data
US 2014/0074372 A1 Mar. 13, 2014

(51) Int. Cl.
*B60K 28/14* (2006.01)
*B60T 7/22* (2006.01)
*B60W 30/08* (2012.01)
*G08G 1/16* (2006.01)

(52) U.S. Cl.
CPC ............... *B60K 28/14* (2013.01); *B60T 7/22* (2013.01); *B60W 30/08* (2013.01); *G08G 1/162* (2013.01); *B60W 2030/082* (2013.01)

(58) Field of Classification Search
CPC ............................ B60W 30/09; B60W 50/085
See application file for complete search history.

(56) References Cited

U.S. PATENT DOCUMENTS

| 8,060,288 B2 * | 11/2011 | Choby | ...................... | B60T 7/20 701/70 |
| 8,103,451 B2 * | 1/2012 | Tanimichi | ............. | B60W 10/18 180/271 |
| 8,160,766 B2 * | 4/2012 | Donnelli | ................ | G07C 5/085 340/443 |
| 8,258,934 B2 * | 9/2012 | Filev | ...................... | B60W 30/02 180/170 |

(Continued)

FOREIGN PATENT DOCUMENTS

ES   EP 0398307 A1 * 11/1990 ............. B60K 28/14
GB   2 265 240 A      9/1993
(Continued)

*Primary Examiner* — Jean-Paul Cass
(74) *Attorney, Agent, or Firm* — Sughrue Mion, PLLC (57) ABSTRACT

An ECU includes a collision determination unit, a condition determination unit, and an output suppression unit. The collision determination unit monitors an acceleration detected by a collision sensor, and determines that a vehicle collision has occurred when the acceleration is greater than a predetermined value. The condition determination unit determines whether or not a vehicular speed absolute value is smaller than a threshold vehicular speed in a determination period lasting from the determination of collision for a predetermined time. The output suppression unit suppresses an output of a vehicle driving force when the vehicular speed absolute value is smaller than the threshold vehicular speed in the determination period.

3 Claims, 6 Drawing Sheets

(56) References Cited

U.S. PATENT DOCUMENTS

| | | | | | |
|---|---|---|---|---|---|
| 8,311,720 | B2* | 11/2012 | Pelosse | ............... | B60W 30/143 123/349 |
| 8,437,890 | B2* | 5/2013 | Anderson | ............. | B60W 30/09 701/23 |
| 8,447,437 | B2* | 5/2013 | Chiang | ................. | G08G 1/165 340/435 |
| 8,471,726 | B2* | 6/2013 | Ekmark | ................. | G08G 1/166 340/435 |
| 8,585,551 | B2* | 11/2013 | Choby | .................... | F16H 61/66 477/120 |
| 8,655,569 | B2* | 2/2014 | Choby | .................... | G06F 19/00 180/197 |
| 8,738,228 | B2* | 5/2014 | Filev | ..................... | B60W 50/08 701/36 |
| 8,751,124 | B2* | 6/2014 | Ahn | ......................... | G06F 7/00 701/70 |
| 8,886,365 | B2* | 11/2014 | Filev | ....................... | B60Q 1/50 340/438 |
| 8,965,645 | B2* | 2/2015 | Ahn | .................... | F16H 61/0213 477/45 |
| 8,989,949 | B2* | 3/2015 | Lohberg | ............ | B60G 17/0195 701/30.3 |
| 9,008,896 | B2* | 4/2015 | Wanami | ............. | B60R 21/0136 701/32.2 |
| 9,008,940 | B2* | 4/2015 | Ueyama | ............. | B60W 30/095 340/435 |
| 2002/0011373 | A1 | 1/2002 | Wielenga | | |
| 2003/0158648 | A1* | 8/2003 | Kubota et al. | .................. | 701/96 |
| 2004/0019426 | A1* | 1/2004 | Knoop | ..................... | B60T 7/22 701/301 |
| 2005/0071071 | A1* | 3/2005 | Nagata | ............................ | 701/70 |
| 2007/0228822 | A1 | 10/2007 | Hirata | | |
| 2008/0147277 | A1* | 6/2008 | Lu | ....................... | B60W 30/085 701/45 |
| 2010/0147258 | A1* | 6/2010 | Edwards | ................ | F02D 17/02 123/198 F |
| 2010/0191391 | A1* | 7/2010 | Zeng | ................... | G01S 13/723 701/1 |
| 2011/0010034 | A1* | 1/2011 | Zagorski et al. | ............. | 701/29 |
| 2011/0155398 | A1* | 6/2011 | Holland et al. | ................. | 169/46 |
| 2011/0238272 | A1* | 9/2011 | Kato | ............................... | 701/55 |
| 2012/0191313 | A1* | 7/2012 | Miyahara | ....................... | 701/70 |
| 2012/0209454 | A1* | 8/2012 | Miller et al. | ..................... | 701/2 |

FOREIGN PATENT DOCUMENTS

| | | |
|---|---|---|
| JP | 5-236602 A | 9/1993 |
| JP | 9-287488 A | 11/1997 |
| JP | 2000-247210 A | 9/2000 |
| JP | 2000-264097 A | 9/2000 |
| JP | 2003-56371 A | 2/2003 |
| JP | 2005-94883 A | 4/2005 |
| JP | 2006-195623 A | 7/2006 |
| JP | 2007-295784 A | 11/2007 |
| JP | 2009-156092 A | 7/2009 |

* cited by examiner

VEHICLE

CROSS REFERENCE TO RELATED APPLICATIONS

This application is a National Stage of International Application No. PCT/JP2011/060936, filed on May 12, 2011, the contents of all of which are incorporated herein by reference in their entirety.

TECHNICAL FIELD

The present invention relates to the control of a driving force of a vehicle after a vehicle collision.

BACKGROUND ART

For a vehicle equipped with a device for detecting a collision of the vehicle, Japanese Patent Laying-Open No. 2000-247210 (PTD 1) discloses an art to prevent the behavior of the vehicle from becoming instable in detecting the vehicle collision by forcibly setting a brake control to a braking state when a brake pedal has not been depressed by a driver and meanwhile forcibly setting an accelerator control to a closed state when an accelerator pedal has been depressed by the driver.

CITATION LIST

Patent Document

PTD 1: Japanese Patent Laying-Open No. 2000-247210
PTD 2: Japanese Patent Laying-Open No. 5-236602
PTD 3: Japanese Patent Laying-Open No. 2003-56371
PTD 4: Japanese Patent Laying-Open No. 2005-94883
PTD 5: Japanese Patent Laying-Open No. 2006-195623
PTD 6: Japanese Patent Laying-Open No. 2007-295784
PTD 7: Japanese Patent Laying-Open No. 2009-156092

SUMMARY OF INVENTION

Technical Problem

However, it is considered that for a certain time after the vehicle collision, a user may depress the accelerator pedal greatly due to the panic from the collision or the user may intentionally perform an operation so as to move the vehicle, for example, to a location where there is a low possibility to encounter a secondary collision. Thereby, as mentioned by PTD 1, if the brake control is forcibly set to the braking state and the accelerator control is set to the closed state for all the cases in detecting the vehicle collision, it will be absolutely impossible for the user to move the vehicle, which instead increases the possibility of encountering a secondary collision.

The present invention has been accomplished in view of the aforementioned problems, and it is therefore an object of the present invention to properly prevent a vehicle from encountering a secondary collision after a vehicle collision.

Solution to Problem

A vehicle according to one aspect the present invention includes a driving unit configured to generate a driving force for the vehicle, and a control unit configured to perform a suppression control to suppress the driving force in the case where a reverse shift operation is performed after the vehicle has encountered a collision to move the vehicle in a direction opposite to a moving direction of the vehicle immediately before the collision.

Preferably, in the case where the reverse shift operation is performed in a period lasting from the occurrence of the collision for a predetermined time, the control unit continues to perform the suppression control until at least the predetermined time has elapsed.

Preferably, in the case where the reverse shift operation is performed and a manipulated amount of an accelerator pedal or a variation rate of the manipulated amount of the accelerator pedal is greater than a threshold value in the period lasting from the occurrence of the collision for the predetermined time, the control unit performs the suppression control.

Preferably, the suppression control is configured to increase the driving force in accordance with a manipulated amount of an accelerator pedal while keeping the driving force smaller than a driving force when the suppression control is not performed.

Preferably, the suppression control is configured to stop generating the driving force regardless of a manipulated amount of an accelerator pedal.

A vehicle according to another aspect of the present invention includes a driving unit configured to generate a driving force for the vehicle, and a control unit configured to perform a suppression control to suppress the driving force greater in a case where a vehicular speed is low than a case where the vehicular speed is high around a time when the vehicle has encountered a collision.

Preferably, the control unit suppresses the driving force greater in a case where the vehicular speed is lower than a threshold vehicular speed than a case where the vehicular speed is higher than the threshold vehicular speed.

Preferably, the control unit performs the suppression control more actively in a case where a vehicular speed maintaining control for automatically maintaining the vehicular speed at a predetermined value is performed than a case where the vehicular speed maintaining control is not performed.

Advantageous Effects of Invention

According to the present invention, it is possible to properly prevent a vehicle from encountering a secondary collision after a vehicle collision.

DESCRIPTION OF EMBODIMENTS

Hereinafter, embodiments of the present invention will be described with reference to the drawings. In the following, the identical parts having identical names and identical functions will be assigned with the identical numerals, and detailed explanation thereof will not be repeated.

Embodiment 1

Figure 1:
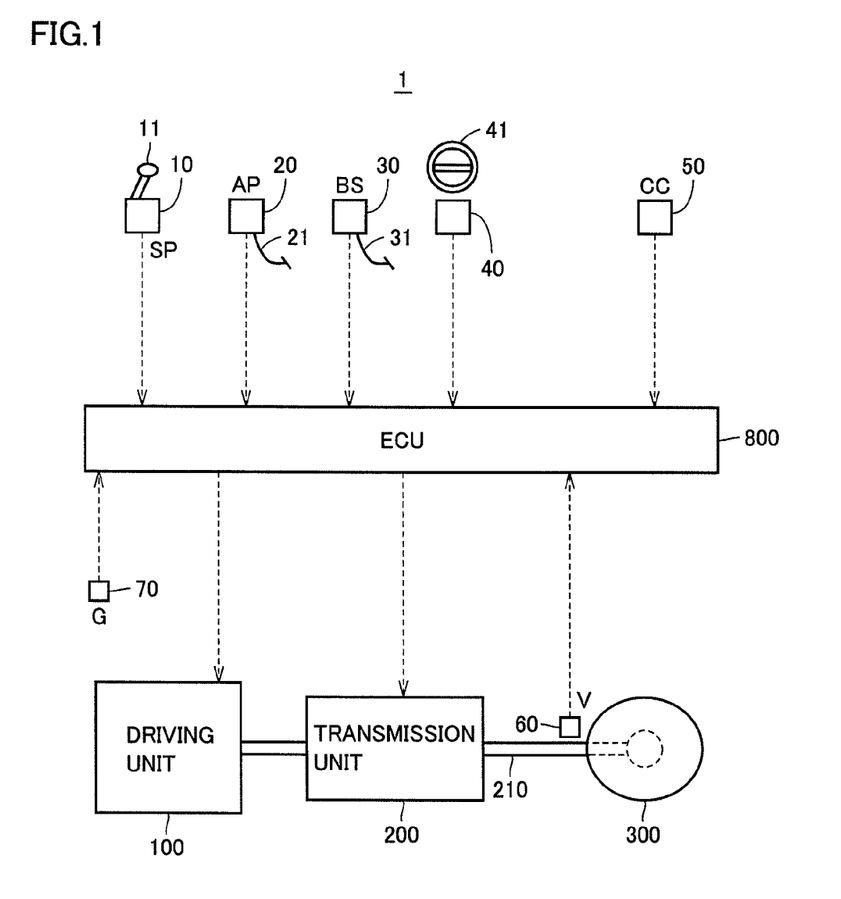
FIG. 1 is an overall block diagram of a vehicle.

FIG. 1 is an overall block diagram of a vehicle 1 mounted with a control unit according to the present embodiment. Vehicle 1 includes a driving unit 100, a transmission unit 200, a wheel 300, and an ECU (Electronic Control Unit) 800. Further, vehicle 1 includes a shift lever 11, an accelerator pedal 21, a brake pedal 31, a steering wheel 41 and a cruise control switch 50, which are configured to be operated by a user. Furthermore, vehicle 1 includes a shift sensor 10, an accelerator position sensor 20, a brake stroke sensor 30, a steering angle sensor 40, a vehicular speed sensor 60, and a collision sensor 70.

Driving unit 100 and transmission unit 200 are controlled by control signals from ECU 800. Driving unit 100 is a unit for generating a vehicle driving force. Typically, driving unit 100 includes an engine, a motor or the like. Transmission unit 200 is disposed between driving unit 100 and wheel 300 for performing a gear change on a rotation speed of driving unit 100 and transmitting the changed rotation speed to wheel 300. A controlled state (hereinafter, referred to as "shift range") of transmission unit 200 may be switched to any one among P (parking) range, R (reverse) range, N (neutral) range and D (drive) range in accordance with a control signal from ECU 800. In addition, D range is a shift range for moving vehicle 1 in a forward direction, and R range is a shift range for moving vehicle 1 in a backward direction.

Shift sensor 10 detects a position (shift position) SP of shift lever 11. Accelerator position sensor 20 detects a manipulated amount of accelerator pedal 21 (accelerator pedal-manipulated amount) AP. Brake stroke sensor 30 detects a manipulated amount (brake stroke) BS of brake pedal 31. Steering angle sensor 40 detects a steering angle of steering wheel 41. Vehicular speed sensor 60 detects a speed (vehicular speed) V of vehicle 1. Collision sensor 70 detects an acceleration G acting on vehicle 1 as information for determining a collision between vehicle 1 and an object. Each of the abovementioned sensors outputs a detection result to ECU 800.

Cruise control switch 50 is a switch for a user to input an actuation request for a cruise control. When the user presses cruise control switch 50, cruise control switch 50 outputs a cruise control requesting signal CC to ECU 800.

ECU 800 is built therein with a CPU (Central Processing Unit) and a memory (both not shown) and is configured to perform a predetermined arithmetic processing on the basis of information stored in the memory and/or information from each sensor. ECU 800, on the basis of the arithmetic processing result, controls each device mounted in vehicle 1.

After receiving the cruise control requesting signal CC from cruise control switch 50, ECU 800 actuates the cruise control. The cruise control is a feedback control which controls an output of driving unit 100 so as to automatically maintain vehicular speed V at a desired speed without needing the user to depress accelerator pedal 21. After receiving the cruise control requesting signal CC from cruise control switch 50, ECU 800 automatically sets the desired speed, and performs the feedback control on the driving force of the vehicle to maintain vehicular speed V at the desired speed. However, in the case where the user depresses brake pedal 31 while the cruise control is in action, ECU 800 terminates the cruise control.

For vehicle 1 having the abovementioned configuration, in the case where vehicle 1 has collided with an object external to the vehicle, it is considered that the user may intentionally perform an operation so as to move vehicle 1 away from the collision object or to a location where the possibility of encountering a secondary collision is low. In this situation, it is very likely that the user may perform an operation of deeply depressing accelerator pedal 21 (hereinafter, referred to as "deep accelerator operation").

For example, supposing that the collision occurs when the vehicle is moving forward, due to the deep accelerator operation after the collision, vehicle 1 is excessively accelerated in the forward direction (the same direction as the moving direction immediately before the collision); therefore, it is very likely that vehicle 1 may encounter a secondary collision with the collision object or another object.

Thus, ECU 800 according to the present embodiment suppresses the output of the vehicle driving force when a collision has occurred between vehicle 1 and an object (hereinafter, referred to as "vehicle collision" or simply as "collision").

Figure 2:
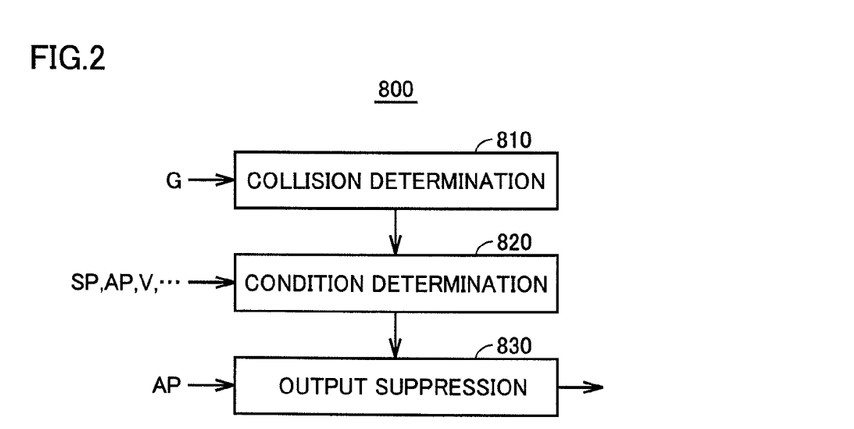
FIG. 2 is a functional block diagram of an ECU.

FIG. 2 is a functional block diagram of ECU 800 on portions related to an output suppression on the vehicle driving force after a collision has been determined. Each functional block illustrated in FIG. 2 may be implemented by hardware or by software.

ECU 800 includes a collision determination unit 810, a condition determination unit 820 and an output suppression unit 830.

Collision determination unit 810 monitors acceleration G detected by collision sensor 70, and determines that the vehicle collision has occurred in the case where acceleration G is greater than a threshold acceleration. Here, by setting the threshold acceleration to a relatively small value, it is possible to detect a relatively mild collision. It is acceptable to determine the vehicle collision on the basis of other information in place of or in addition to acceleration G. Even if the collision has not been confirmed, the following control may be performed in the case that a characteristic variation of parameters intrinsic to the occurrence of a collision is detected.

Condition determination unit 820 determines whether or not a vehicular speed absolute value |V| is smaller than a threshold vehicular speed V0 in a period (hereinafter, referred to as "determination period") lasting from the determination of collision for a predetermined time T0.

In the case where vehicular speed absolute value |V| is determined to be smaller than threshold vehicular speed V0 in the determination period, output suppression unit 830 controls driving unit 100 to suppress the output of the vehicle driving force. Thereby, the secondary collision can be prevented. The prevention of a secondary collision includes preventing the secondary collision itself from occurring, and also includes preventing the secondary collision from causing further damages.

As a specific approach of the output suppression, for example, it is acceptable to reduce the value of a vehicle driving force relative to accelerator pedal-manipulated amount AP smaller than that in normal time (when no collision has occurred and thereby the output is not suppressed), and it is also acceptable to restrict an increasing rate of the vehicle driving force relative to normal time. In either case, since it is considered that after the vehicle collision the user may intentionally perform an operation so as to move vehicle 1 to avoid a secondary collision, it is desirable that the operation (request) performed by the user may affect the vehicle driving force in an appropriate manner. Therefore, output suppression unit 830 suppresses the vehicle driving force but does not reduce it completely to zero. Accordingly, though being suppressed to be smaller than normal time, the vehicle driving force increases in accordance with accelerator pedal-manipulated amount AP.

Further, in the case where vehicular speed absolute value |V| is greater than threshold vehicular speed V0, output suppression unit 830 will not perform the output suppression on the vehicle driving force even in the determination period.

Output suppression unit 830 continues the above output suppression until the determination period has elapsed. Instead of the determination period, it is acceptable to continue the output suppression until a predetermined time has elapsed from the start of the output suppression. However, even in this case, it is desirable to continue the output suppression until at least the determination period has elapsed.

After the determination period has elapsed, output suppression unit 830 deactivates the output suppression. However, in order to prevent the driving force from rising abruptly, the output suppression should be deactivated by returning back to the normal control gradually.

Figure 3:
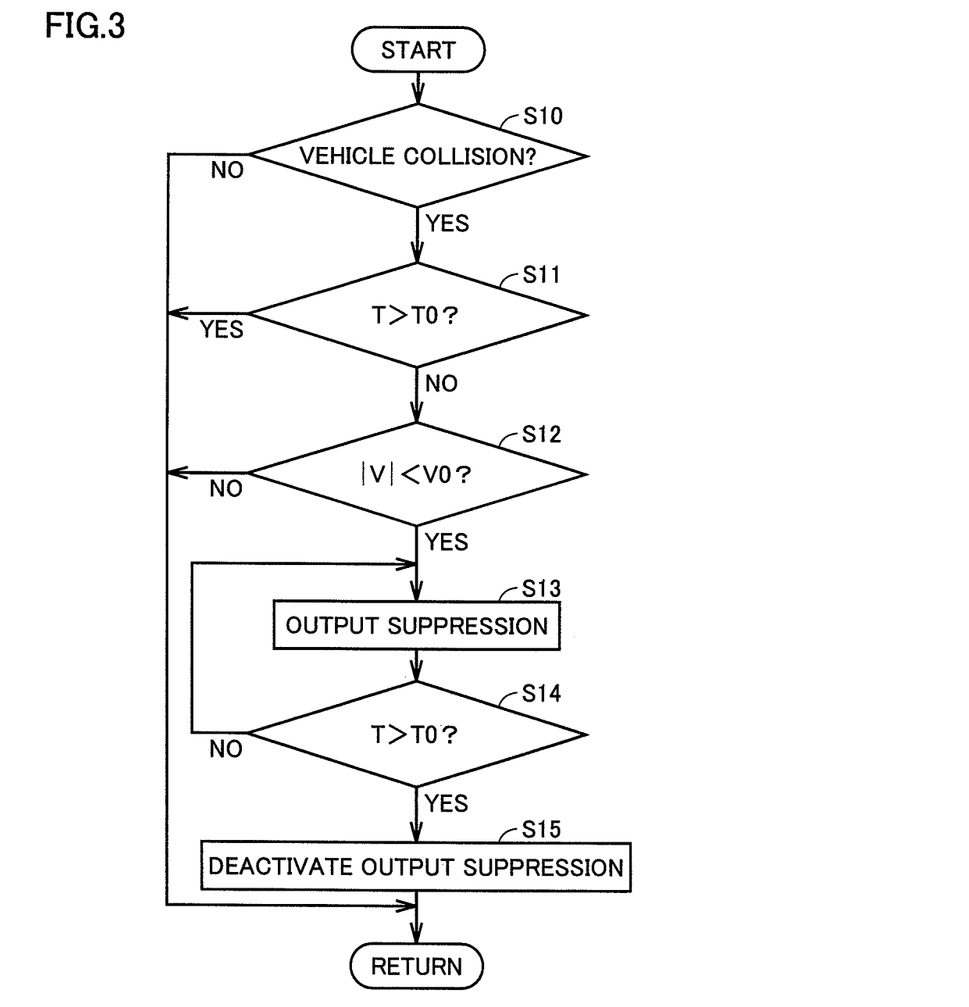
FIG. 3 is a flow chart (Example 1) illustrating a processing sequence of the ECU.

FIG. 3 is a flow chart illustrating a processing sequence of ECU 800 for accomplishing the above functions. The flow chart to be described hereinafter is executed repeatedly in a predetermined cycle during the travelling of the vehicle.

At step (hereinafter, step will be abbreviated as "S") 10, ECU 800 determines whether or not a vehicle collision is present on the basis of the output from collision sensor 70. If it is determined that a vehicle collision is not present (NO at S10), ECU 800 terminates the processing.

If it is determined that a vehicle collision is present (YES at S10), ECU 800 determines whether or not an elapsed time T from the collision determination is greater than predetermined time T0 at S11. If elapsed time T is greater than predetermined time T0 (YES at S11), ECU 800 terminates the processing. If elapsed time T is not greater than predetermined time T0 (NO at S11), ECU 800 determines whether or not vehicular speed absolute value |V| is smaller than threshold vehicular speed V0 at S12. If vehicular speed absolute value |V| is greater than threshold vehicular speed V0 (NO at S12), ECU 800 terminates the processing.

If vehicular speed absolute value |V| is smaller than threshold vehicular speed V0 (YES at S12), ECU 800 performs the output suppression on the vehicle driving force at S13. Thereafter, at S14, ECU 800 determines whether or not elapsed time T is greater than predetermined time T0. ECU 800 returns to S13 to perform the processing to continue the output suppression as long as elapsed time T is not greater than predetermined time T0 (NO at S14).

If elapsed time T is greater than predetermined time T0 (YES at S14), ECU 800 deactivates the output suppression on the vehicle driving force at S15.

As mentioned in the above, according to the present embodiment, in the determination period lasting from the occurrence of a vehicle collision (including a mild vehicle collision) for predetermined time T0, ECU 800 suppresses the output of the vehicle driving force for a certain time in the case where vehicular speed absolute value |V| is smaller than threshold vehicular speed V0. Accordingly, it is possible to properly prevent the secondary collision.

At this time, ECU 800 does not reduce the vehicle driving force completely to zero. Thereby, in the case where the user issues a request of intentionally moving vehicle 1, it is possible to have the vehicle moved in accordance to the request.

Embodiment 2

In Embodiment 1 described above, the output of the vehicle driving force is suppressed in the case where vehicular speed absolute value |V| is smaller than threshold vehicular speed V0 in the determination period.

However, in the case where the vehicle collision has occurred, for example, when the vehicle is moving forward, it is considered that in order to move vehicle 1 away from the collision object so as to protect the collision object, for example, the user may perform a shift operation to move vehicle 1 in a backward direction (the direction opposite to the moving direction immediately before the collision). However, if a deep accelerator operation is performed after the shift operation, it is likely that vehicle 1 may encounter a secondary collision with another object existing in the rear side. Hereinafter, the shift operation to move vehicle 1 in a direction opposite to the moving direction immediately before the collision is referred to as "reverse shift operation", and the direction in which vehicle 1 is moved according to the reverse shift operation is referred to as "reverse shift direction".

In the present embodiment, in the determination period, in the case where condition (i) where the reverse shift operation is performed and condition (ii) where a variation amount of the accelerator pedal-manipulated amount per unit time (hereinafter referred to as "accelerator variation rate") $\Delta AP$ is greater than a threshold variation rate $\Delta AP0$ or accelerator pedal-manipulated amount AP is greater than a threshold manipulated amount AP0 are met, the output of the vehicle driving force is suppressed. The other configurations, functions and processing are similar to those in Embodiment 1, and thereby detailed explanation thereof will not be repeated.

Figure 4:
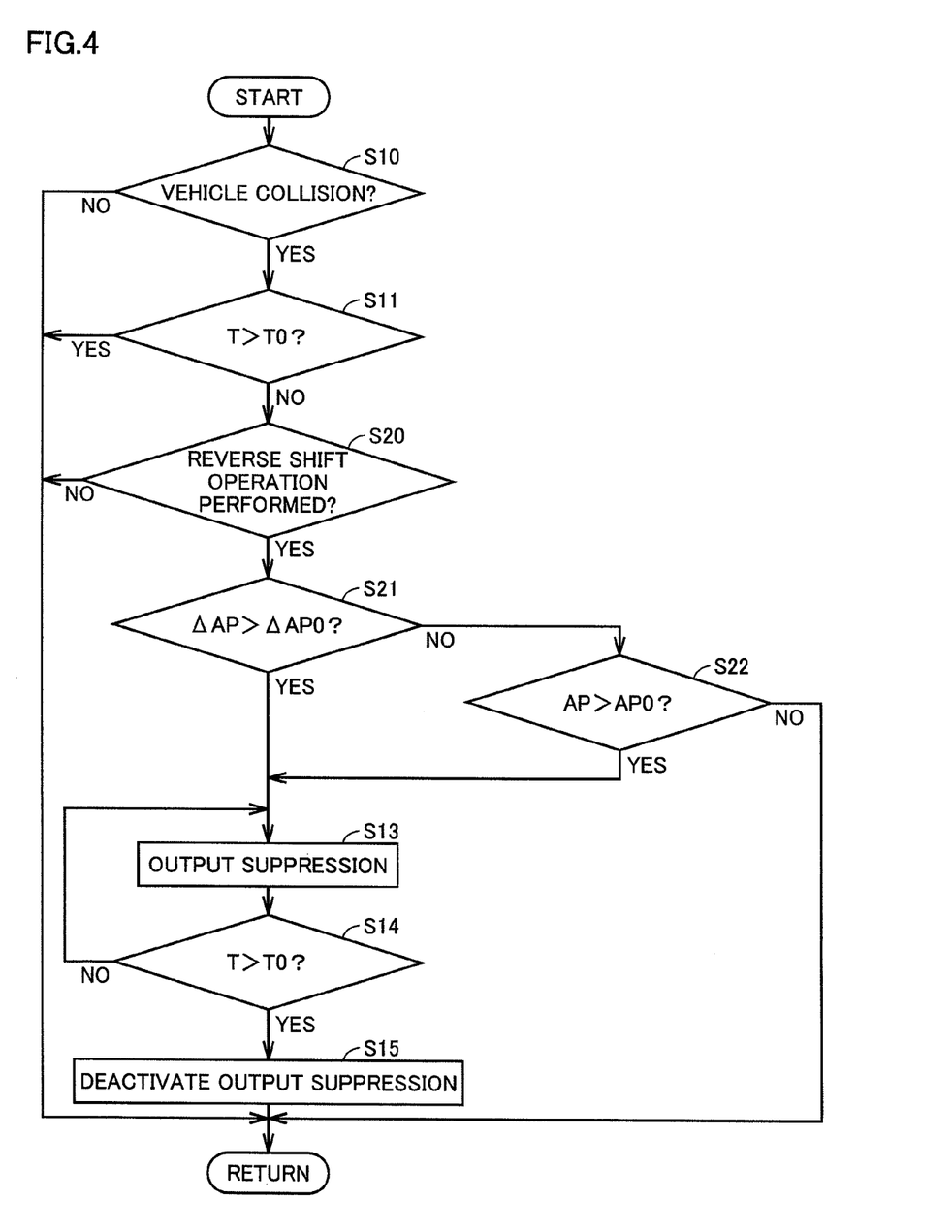
FIG. 4 is a flow chart (Example 2) illustrating a processing sequence of the ECU.

FIG. 4 is a flow chart illustrating a processing sequence of ECU 800 according to the present embodiment. FIG. 4 is obtained by replacing the processing of S12 in FIG. 3 with the processing from S20 to S22. Among steps illustrated in FIG. 4, the steps assigned with identical numbers to those steps illustrated in FIG. 3 have already been described, and thereby detailed explanation thereof will not be repeated here.

As illustrated in FIG. 4, in the case where elapsed time T after the collision determination is not greater than predetermined time T0 (NO at S11), ECU 800 determines whether or not the reverse shift operation is performed at S20. If the reverse shift operation is not performed (NO at S20), ECU 800 terminates the processing.

If the reverse shift operation is performed (YES at S20), ECU 800 determines whether or not accelerator variation rate $\Delta AP$ is greater than threshold variation rate $\Delta AP0$ at S21. If accelerator variation rate $\Delta AP$ is not greater than threshold variation rate $\Delta AP0$ (NO at S21), ECU 800 determines whether or not accelerator pedal-manipulated amount AP is greater than threshold manipulated amount AP0 at S22.

If accelerator variation rate $\Delta AP$ is not greater than threshold variation rate $\Delta AP0$ (NO at S21) and accelerator pedal-manipulated amount AP is not greater than threshold manipulated amount AP0 (NO at S22), ECU 800 terminates the processing.

On the other hand, if accelerator variation rate $\Delta AP$ is greater than threshold variation rate $\Delta AP0$ (YES at S21), or accelerator pedal-manipulated amount AP is greater than threshold manipulated amount AP0 (YES at S22), ECU 800 performs the output suppression on the vehicle driving force at S13.

As mentioned in the above, according to the present embodiment, in the determination period lasting from the occurrence of a vehicle collision for predetermined time T0, ECU 800 suppresses the output of the vehicle driving force in the case where the reverse shift operation is performed and accelerator variation rate ΔAP is greater than threshold variation rate ΔAP0 (or accelerator pedal-manipulated amount AP is greater than threshold manipulated amount AP0). Accordingly, it is possible to properly prevent the secondary collision with an object present in the reverse shift direction.

It is acceptable to reduce the vehicle driving force completely to zero regardless of the magnitude of accelerator pedal-manipulated amount AP.

Modification 1 of Embodiment 2

In Embodiment 2 mentioned above, in the determination period, the output of the vehicle driving force is suppressed when two conditions of condition (i) where the reverse shift operation is performed and condition (ii) where accelerator variation rate ΔAP is greater than threshold variation rate ΔAP0 (or accelerator pedal-manipulated amount AP is greater than a threshold manipulated amount AP0) are met.

However, condition (ii) mentioned in the above may be eliminated, and the output of the vehicle driving force may be suppressed in the case where only condition (i) is met.

Figure 5:
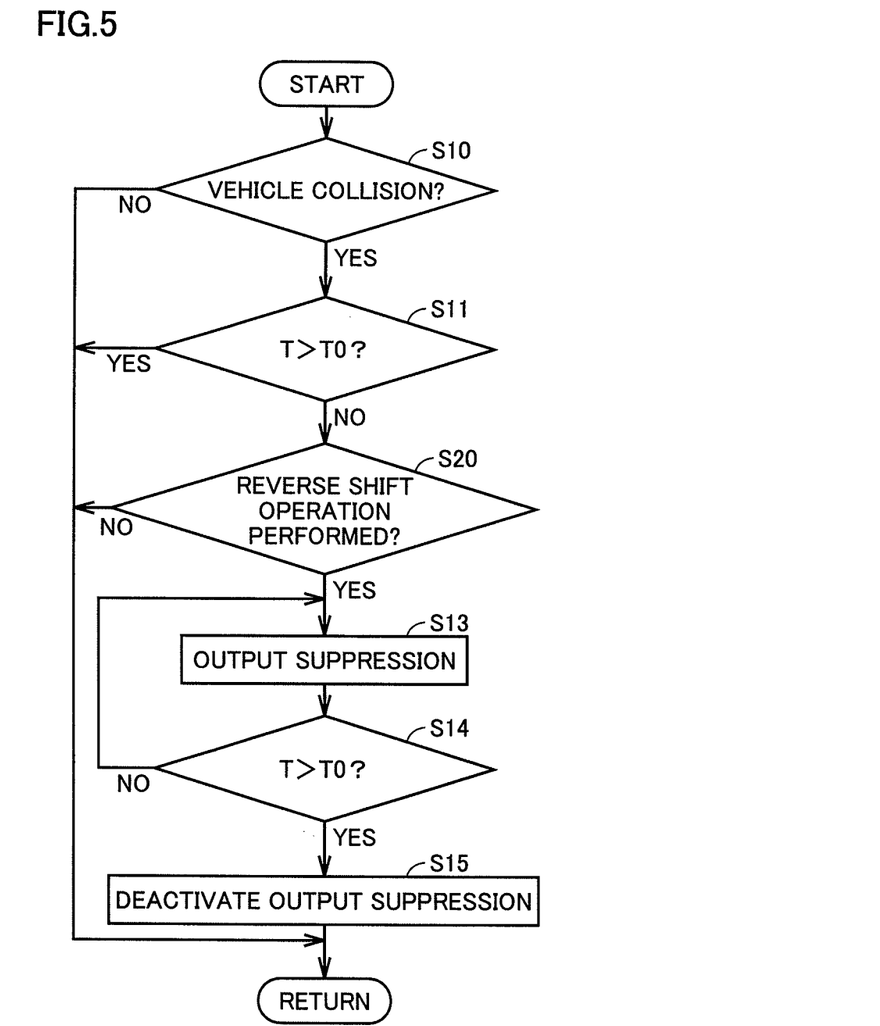
FIG. 5 is a flow chart (Example 3) illustrating a processing sequence of the ECU.

FIG. 5 is a flow chart illustrating a processing sequence of ECU 800 according to the present modification. FIG. 5 is obtained by eliminating the processing of S21 and S22 in FIG. 4. Among steps illustrated in FIG. 5, the steps assigned with identical numbers to those steps illustrated in FIG. 4 have already been described, and thereby detailed explanation thereof will not be repeated here.

As illustrated in FIG. 5, in the case where elapsed time T after the collision determination is not greater than predetermined time T0 (NO at S11), ECU 800 according to the present modification determines whether or not the reverse shift operation is performed at S20, and suppresses the output of the vehicle driving force (S13) if the reverse shift operation is performed (YES at S20).

Thereby, in the case where the reverse shift operation is performed, it is possible to suppress the acceleration in the reverse shift direction as early as possible regardless of the magnitude and/or the variation rate of accelerator pedal-manipulated amount AP.

Modification 2 of Embodiment 2

In Embodiment 2 mentioned above, in the determination period, the output of the vehicle driving force is suppressed when two conditions of condition (i) where the reverse shift operation is performed and condition (ii) where accelerator variation rate ΔAP is greater than threshold variation rate ΔAP0 (or accelerator pedal-manipulated amount AP is greater than a threshold manipulated amount AP0) are met.

However, condition (i) mentioned in the above may be eliminated, and the output of the vehicle driving force may be suppressed in the case where only condition (ii) is met.

Figure 6:
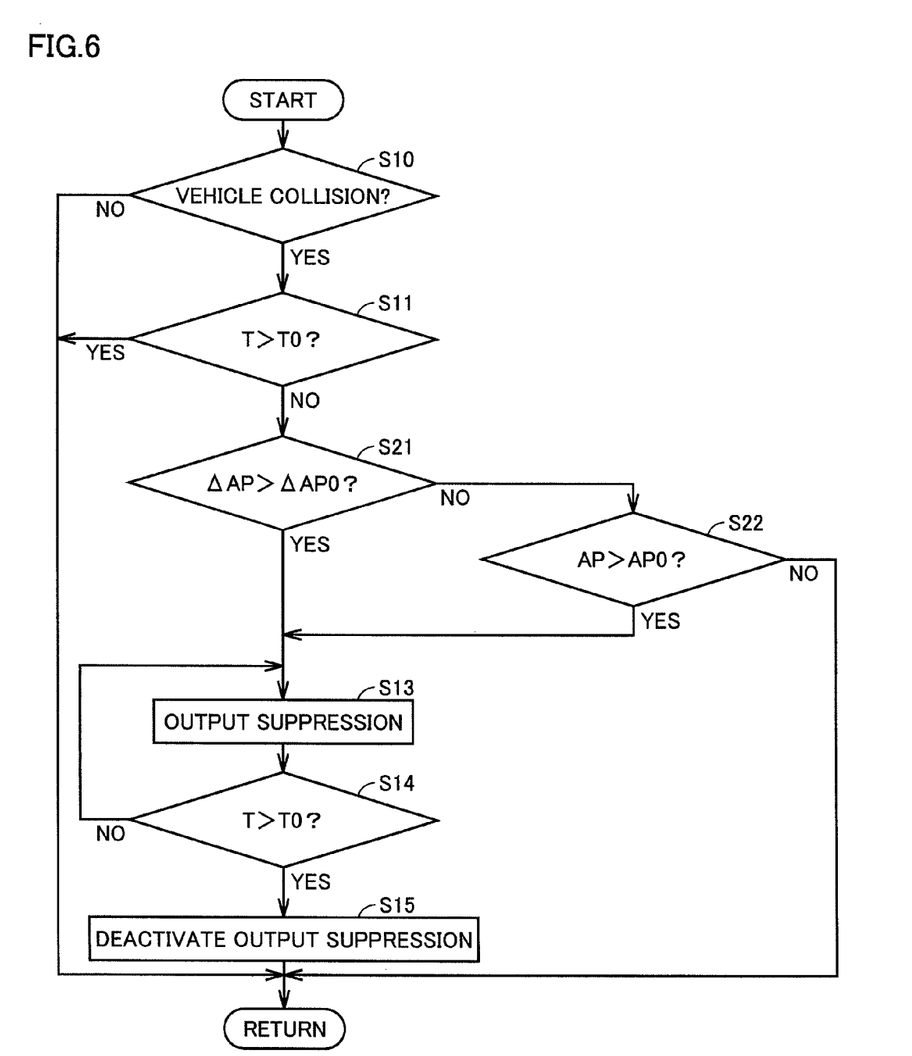
FIG. 6 is a flow chart (Example 4) illustrating a processing sequence of the ECU.

FIG. 6 is a flow chart illustrating a processing sequence of ECU 800 according to the present modification. FIG. 6 is obtained by eliminating the processing of S20 in FIG. 4. Among steps illustrated in FIG. 6, the steps assigned with identical numbers to those steps illustrated in FIG. 4 have already been described, and thereby detailed explanation thereof will not be repeated here.

As illustrated in FIG. 6, in the case where elapsed time T after the collision determination is not greater than predetermined time T0 (NO at S11), ECU 800 according to the present modification determines whether or not accelerator variation rate ΔAP is greater than threshold variation rate ΔAP0 or whether or not accelerator pedal-manipulated amount AP is greater than threshold manipulated amount AP0 (S21, S22). If accelerator variation rate ΔAP is greater than threshold variation rate ΔAP0 (YES at S21) or if accelerator pedal-manipulated amount AP is greater than threshold manipulated amount AP0 (YES at S22), ECU 800 suppresses the output of the vehicle driving force (S13).

By performing such control, it is also possible to properly prevent the secondary collision.

Embodiment 3

In Embodiment 1 mentioned above, when vehicular speed absolute value |V| is greater than threshold vehicular speed V0 (NO at S12 of FIG. 3), the output of the vehicle driving force is not suppressed.

However, in the present embodiment, even if vehicular speed absolute value |V| is greater than threshold vehicular speed V0, the output of the vehicle driving force will be suppressed in the case where accelerator variation rate ΔAP is greater than threshold variation rate ΔAP0 (or accelerator pedal-manipulated amount AP is greater than threshold manipulated amount AP0) on the condition that the cruise control is in action.

Figure 7:
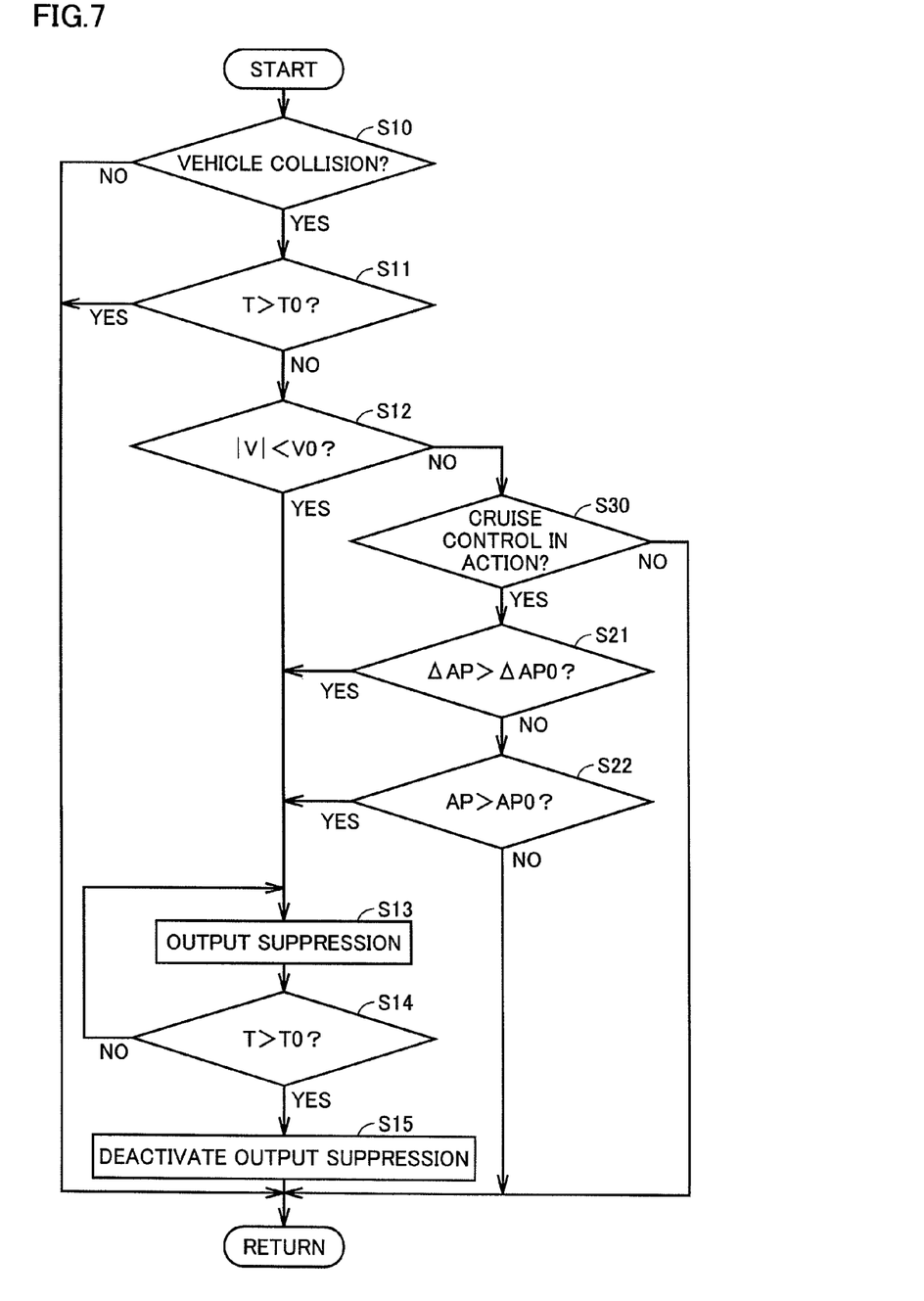
FIG. 7 is a flow chart (Example 5) illustrating a processing sequence of the ECU.

FIG. 7 is a flow chart illustrating a processing sequence of ECU 800 according to the present embodiment. Among steps illustrated in FIG. 7, the steps assigned with identical numbers to those steps illustrated in FIGS. 3 and 4 have already been described, and thereby the detailed descriptions thereof will not be repeated here.

As illustrated in FIG. 7, in the case where elapsed time T after the collision determination is not greater than predetermined time T0 (NO at S11), ECU 800 according to the present embodiment determines whether or not vehicular speed absolute value |V| is smaller than threshold vehicular speed V0 at S12.

If vehicular speed absolute value |V| is smaller than threshold vehicular speed V0 (YES at S12), ECU 800 performs the output suppression on the vehicle driving force at S13.

On the other hand, if vehicular speed absolute value |V| is greater than threshold vehicular speed V0 (NO at S12), ECU 800 determines whether or not a cruise control is in action at S30. As mentioned above, the cruise control automatically maintains vehicular speed V at a desired speed even if accelerator pedal 21 is not depressed by the user. Meanwhile, the cruise control will be terminated in the case where the user depresses brake pedal 31. Thereby, in the case where the cruise control is in action, it is possible that the deep accelerator operation will be made after a collision since in most cases, neither of accelerator pedal 21 and brake pedal 31 will be depressed by the user.

Thus, even if vehicular speed absolute value |V| is greater than threshold vehicular speed V0 (NO at S12), when the cruise control is in action (YES at S30), on a condition that accelerator variation rate ΔAP is greater than threshold variation rate ΔAP0 (YES at S21) or accelerator pedal-manipulated amount AP is greater than threshold manipulated amount AP0 (YES at S22), ECU 800 performs the output suppression on the vehicle driving force at S13.

As mentioned above, according to the present embodiment, in the determination period lasting from the vehicle collision for predetermined time T0, even if vehicular speed absolute value |V| is greater than threshold vehicular speed V0, in the case where the cruise control is in action, ECU 800 performs the output suppression on the vehicle driving force. Thereby, the secondary collision can be prevented properly.

Embodiments 1 to 3 and the modifications thereof may be combined appropriately where necessary.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1: vehicle; 10: shift sensor; 11: shift lever; 20: accelerator position sensor; 21: accelerator pedal; 30: brake stroke sensor; 31: brake pedal; 40: steering angle sensor; 41: steering wheel; 50: cruise control switch; 60: vehicular speed sensor; 70: collision sensor; 100: driving unit; 200: transmission unit; 300: wheel; 800: ECU; 810: collision determination unit; 820: condition determination unit; 830: output suppression unit

The invention claimed is:

1. A vehicle comprising:
   a driving unit configured to generate a driving force for the vehicle; and
   a control unit configured to perform a suppression control to suppress said driving force greater in a case where said vehicle has encountered a collision and a vehicular speed maintaining control for automatically maintaining the vehicular speed at a predetermined value is performed than a case where said vehicle has encountered a collision and said vehicular speed maintaining control is not performed,
   wherein the control unit increases said driving force in accordance with an amount that an accelerator pedal is manipulated while said driving force is suppressed greater than zero and the case where said vehicle has encountered the collision and said vehicular speed maintaining control is not performed.

2. The vehicle according to claim 1, wherein said control unit performs said suppression control in a case where said vehicular speed is lower than a threshold vehicular speed at a time when said vehicle has encountered a collision regardless of whether or not said vehicular speed maintaining control is being performed.

3. The vehicle according to claim 1, wherein the control unit deactivates said suppression control when a predetermined time period elapses after the suppression control is activated, and decreases a suppression amount gradually when said suppression control is deactivated and the vehicle returns to normal control.

* * * * *